(12) United States Patent
Brake et al.

(10) Patent No.: US 11,682,204 B2
(45) Date of Patent: Jun. 20, 2023

(54) RECOGNITION ASSISTANT

(71) Applicant: International Business Machines Corporation, Armonk, NY (US)

(72) Inventors: Kyle Matthew Brake, Westerville, OH (US); Keith Gregory Frost, Delaware, OH (US); Stephen Arthur Boxwell, Franklin, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/939,967

(22) Filed: Jul. 27, 2020

(65) Prior Publication Data
US 2022/0027625 A1 Jan. 27, 2022

(51) Int. Cl.
| | | |
|---|---|---|
| *G10L 17/04* | (2013.01) | |
| *G06V 20/00* | (2022.01) | |
| *G06V 30/14* | (2022.01) | |
| *G06V 40/00* | (2022.01) | |
| *G06V 20/20* | (2022.01) | |
| *G10L 15/26* | (2006.01) | |
| *G10L 17/22* | (2013.01) | |
| *G10L 15/22* | (2006.01) | |

(52) U.S. Cl.
CPC ............. *G06V 20/20* (2022.01); *G10L 15/26* (2013.01); *G10L 17/22* (2013.01); *G10L 2015/223* (2013.01)

(58) Field of Classification Search
USPC ........ 706/1–45; 704/200–275; 382/100–123, 382/154–227
See application file for complete search history.

(56) References Cited

U.S. PATENT DOCUMENTS

| | | | |
|---|---|---|---|
| 8,930,829 B2 | 1/2015 | Patel | |
| 9,195,769 B2 * | 11/2015 | Schiff | ................... G06F 16/951 |
| 9,883,343 B2 | 1/2018 | De Vries | |
| 9,916,328 B1 * | 3/2018 | Sharifi | ................... G06F 40/295 |
| 10,056,080 B2 | 8/2018 | Tokatyan | |
| 10,341,487 B2 | 7/2019 | Mulay | |

(Continued)

OTHER PUBLICATIONS

Jasinschi Radu Serban, Method and System for Assisting Patients, Dec. 6, 2012 (Year: 2012).*

(Continued)

*Primary Examiner* — Marcellus J Augustin
(74) *Attorney, Agent, or Firm* — Aaron Pontikos (57) ABSTRACT

A method provides for assistance in recognition of an entity. A set of data and associated information corresponding to a plurality of entities known to an assisted user is received, such that an instance of the set of data and associated information includes identification of a respective entity of the plurality of entities known to an assisted user. Real-time data corresponding to a first entity is received from one or more devices capturing the real-time data. The real-time data is compared to the set of data and associated information corresponding to the plurality of entities known to the user to determine whether the first entity has a known relevance to the user, and in response to determining the first entity does have a known relevance to the user, the processor provides the identity and relevance of the first entity to the user.

18 Claims, 3 Drawing Sheets

(56) References Cited

U.S. PATENT DOCUMENTS

| | | | |
|---|---|---|---|
| 10,367,928 | B2 | 7/2019 | Lau |
| 10,390,771 | B2 | 8/2019 | Lorden |
| 10,402,446 | B2* | 9/2019 | Kamath ................ G06F 16/532 |
| 11,275,901 | B2* | 3/2022 | Shek ........................ G06F 40/30 |
| 11,341,186 | B2* | 5/2022 | Bender ................ G06F 16/784 |
| 11,436,906 | B1* | 9/2022 | Peddinti ........... G08B 13/19613 |
| 2011/0026778 | A1 | 2/2011 | Ye |
| 2012/0095862 | A1* | 4/2012 | Schiff .................... G06Q 30/06 705/26.7 |
| 2015/0089396 | A1 | 3/2015 | Song |
| 2016/0154948 | A1* | 6/2016 | Guo ....................... G16H 20/70 705/2 |
| 2016/0164809 | A1 | 6/2016 | Krug |
| 2016/0350812 | A1* | 12/2016 | Priness .............. G06Q 30/0269 |
| 2017/0300629 | A1 | 10/2017 | Ross |
| 2018/0239767 | A1* | 8/2018 | Bostick ............... G06F 16/4393 |
| 2018/0253954 | A1 | 9/2018 | Verma |
| 2018/0341855 | A1* | 11/2018 | Childress ............. G06V 10/764 |
| 2019/0019054 | A1 | 1/2019 | Waxman |
| 2021/0365673 | A1* | 11/2021 | Stockton ................ G06V 40/70 |

OTHER PUBLICATIONS

Qiming sun et al. An Auxiliary Notification System for Amnesiac Patients Based on Face Recognition and Voice Synthesis Using Cloud Computing, 2018 (Year: 2018).*

Kartik et al., "Security System With Face Recognition, SMS Alert And Embedded Network Video Monitoring Terminal", 11 pps., International Journal of Security, Privacy and Trust Management ( IJSPTM) vol. 2, No. 5, Oct. 2013.

Khachaturian et al., "ACT@Home: Affective and Cognitive Technologies for Assistance in the Home", ISI Journal Citation Reports© Ranking: 2018:4/199 (Clinical Neurology), Online ISSN:1552-5279, © Alzheimer's Association, 6 pps., <https://www.alzheimersanddementia.com/article/S1552-5260(16)30800-7/fulltext#sec2>.

Korzepa et al., "Modeling User Intents as Context in Smartphone-connected Hearing Aids", UMAP'18 Adjunct, Jul. 8-11, 2018, Singapore, Singapore, © 2018 Copyright held by the owner/author(s), ACM ISBN 978-1-4503-5784-May 18, 2007, 5 pps., <https://www.eriksholm.com/-/media/eriksholm/main/files/publications/2018/korzepa_modeling-user-intents-as-context-in-smartphone-conected-hearing-aids.pdf?la=en>.

Mariappan et a., "Towards Real-Time Visual Biometric Authentication Using Human Face For Healthcare Telepresence Mobile Robots", Journal of Telecommunication, Electronic and Computer Engineering, ISSN: 2180-1843, e-ISSN: 2289-8131, vol. 8 No. 11, 6 pps.

Moyle et al., "Connecting The Person With Dementia And Family: A Feasibility Study Of A Telepresence Robot", BMC Geriatrics 2014, 14:7 http://www.biomedcentral.com/1471-2318/14/7. Research Article, 11 pps.

Sun et al., "An Auxiliary Notification System For Amnesiac Patients Based On Face Recognition And Voice Synthesis Using Cloud Computing", 7 pps., CACRE, IOP Publishing, IOP Conf. Series: Materials Science and Engineering 428 (2018) 012024 doi:10.1088/1757-899X/428/1/012024.

Wang, "Deep Learning Reinvents the Hearing Aid", IEEE Spectr. Mar. 2017; 54(3): 32-37, Published online Feb. 28, 2017, 17 pps., <https://www.ncbi.nlm.nih.gov/pmc/articles/PMC6328256/>.

Zhao et al., "A Face Recognition Application For People With Visual Impairments: Understanding Use Beyond The Lab", CHI 2018, Apr. 21-26, 2018, Montreal, QC, Canada, © 2018 Association for Computing Machinery, ACM ISBN 978-1-4503-5620-Jun. 18, 2004, 14 pps.

* cited by examiner

RECOGNITION ASSISTANT

FIELD OF THE INVENTION

The present invention relates generally to the field of identification based on digitized data comparison, and more particularly to assisting recognition of an entity based on comparison of real-time digitized data to pre-processed and annotated digitized data.

BACKGROUND OF THE INVENTION

Current technology includes advanced apparatus for capturing video and audio input of entities within an environment, such as people, objects, structures, and location or event identifying attributes. In addition, metadata and annotations can be added to or associated with captured video frames and audio input.

Image capturing devices, such as smartphones, smart watches, surveillance cameras, body cameras and doorbell cameras enable the capture and display or storage of image data, such as a frame of a video capture or a photograph image. Image and object recognition technology enables identification of a person, object, or location based on characteristics and attributes of the captured image. Similarly, audio data technology can compare and identify sources of audio, such as voice recognition, or sounds related to or unique to a particular location.

Speech-to-text technologies enable analysis and determination of subject matter or topic of captured audio of conversation. The speech-to-text and text-to-speech technologies enable generation of topic summaries of monitored conversations that can be stored as digitized text and converted to machine-based speech, which can be delivered as an audio feed to a user.

SUMMARY

Embodiments of the present invention disclose a method, computer program product, and system. The embodiments include a method to assist in recognition of an entity. The method providing for a processor to receive a set of data and associated information corresponding to a plurality of entities known to an assisted user, wherein an instance of data and associated information of the set of data and associated information includes identification of a respective entity of the plurality of entities known to the assisted user. The processor receives real-time data corresponding to a first entity from one or more devices capturing the real-time data. The processor compares the real-time data to the set of data and associated information corresponding to the plurality of entities known to the assisted user to determine whether the first entity has a known relevance to the assisted user, and in response to determining the first entity does have a known relevance to the assisted user, the processor provides the identity and relevance of the first entity to the assisted user.

DETAILED DESCRIPTION

Most people take for granted their ability to observe and recognize people, objects, or a familiar location associated with their surroundings. Embodiments of the present invention recognize that people that are vision or recognition challenged often find themselves in awkward or uncomfortable situations. Difficulty determining information about surroundings or recognition of people encountered can create difficulties and, in some cases, pose danger. In some cases, a person that is visually or recognition challenged may be taken advantage of due to their uncertainty of recognizing other people, objects, or certain locations.

Embodiments of the present invention provide a method, computer program product, and computer system for assisting recognition of an entity, by comparing digitized data and digitized information of a plurality of entities known to a particular user, to real-time digitized data from video images and/or audio input received from monitoring-capable devices. An entity can be an observed or encountered person or item detected by an Internet-of-things (IoT) device. The IoT device captures digitized data of the entity, such as an image frame of a photograph or video, or audio content, and compares the image frame or audio content to a pre-processed image frame or audio content. The pre-processed data includes identification information of the entity as text or audio associated with the digitized data of the entity and may be converted by use of text-to-speech or speech-to-text technologies.

Embodiments of the present invention include a set of data corresponding to a plurality of entities known to the particular user, hereafter the particular user benefitting from embodiments of the present invention is referred to as "a/the assisted user." The set of data includes images identifying respective entities of the plurality of entities based on facial and object recognition technologies, generated by pre-processing of the images and annotating the images with information identifying the entity. In some embodiments, the annotations corresponding to images identifying an entity include information indicating the relevance of the entity to the user. In some embodiments, the information associated with the entity includes recommended actions for the user to take upon identification of the entity. In other embodiments, the information associated with the entity includes annotations reminding the user of topics related to the previous encounter with the identified entity.

The images, image frames, audio input, and textual content input referred to herein includes the digitized data associated with the respective captured input, which may be referred to as "digitized" or for brevity, may be referred to respectively as images, image frames, audio input, text, or textual content input associated with a respective entity.

In response to determining whether an observed entity is known to the assisted user, embodiments of the present invention provide identification of the observed entity, providing assistance to the recognition of the entity by the assisted user, and may include information that indicates the relevance of the entity to the assisted user, as well as a relationship, if any, of the entity to the assisted user. In some embodiments, the observed or encountered entity is determined to be unknown to the assisted user and, in response, the assisted user is informed that the identity of the entity is unknown and may include additional information of recommended actions to take. In some embodiments, the information associated with a previous contact with an entity is provided to the assisted user which may include instruction of an action to take, historic information from the previous encounter with the entity, reminders associated with the entity, and detailed information beyond identification of the entity.

In embodiments of the present invention, an entity can be a person, animal, plant, structure, object, location, or event that can be detected by an image capturing device or audio capturing device. Captured images and/or audio content may be compared to pre-processed images or audio content to identify an observed entity as an entity known to the assisted user, and additional information often included as annotations to the images or audio content associated with the entity, is provided to the assisted user. The additional information may be input as text and provided to the assisted user by use of text-to-speech technology or may be provided by delivery of text-based content to a display accessible to the assisted user. In other embodiments, the additional information may be input as audio content and converted to text associated with a known entity in pre-processed data and information 123, using speech-to-text technology.

For example, the assisted user may have a friend, Sasha, a sister, Tessa who has a dog named Prince, and a favorite restaurant called "Bonafide's," each of which is a known entity of the assisted user. Pre-processing of images of the known entities are captured and annotated with information text identifying the entity, the relevance of the entity to the assisted user, and in some cases may include additional information as a reminder or related to a previous encounter with the entity.

In the example embodiment, an image of the assisted user's friend Sasha is captured and annotated with text describing Sasha as a friend for the last 15 years, that they met at a concert, and that Sasha's birthday is June $12^{th}$. An image of the assisted user's sister, Tessa is captured and annotated with her relationship as the assisted user's sister, and may include the sister's address and contact information, among other information. An image of Tessa's dog is captured and annotated with the dog's name, "Prince," and information is include indicating the dog loves to chase tennis balls. Also, in the example embodiment, an image of the outside and inside of "Bonafide's" restaurant is captured and annotated with information describing the restaurant as the assisted user's favorite place to eat and include the menu items frequently ordered. The captured images and annotations are stored in a repository of digitized data and information as pre-processed entities known to the assisted user.

In embodiments of the present invention, a recognition program compares real-time image captures of an entity to the stored data and information of entities known to the assisted user to determine whether the entity is known and the relevance of the entity to the assisted user. If recognition is confirmed, then the program provides the information that identifies the entity and the relevance of the entity to the assisted user. Embodiments make use of the connectivity of the recognition program, discussed below as recognition program 200, to Internet of things (IoT) devices that include monitoring functions such as video frame capture and audio capture and playback, as well as the connectivity to the repository of stored data and information of entities known to the assisted user.

In some embodiments, the pre-processed data and information captured and stored include digitized audio captured from microphones included in IoT devices located in the immediate proximity of the assisted user. In some embodiments, the pre-processed digitized data and text information are used to train facial recognition, object recognition, and voice recognition technologies employed to compare real-time input of entity data to the pre-processed data and information of entities known to the assisted user. In some embodiments, text-to-speech and speech-to-text technologies are utilized to annotate image or audio data with information associated with the identification of an entity and relevance of the entity to the assisted user. In some embodiments of the present invention, activation of the video frame or audio capture is triggered by a proximity sensor or motion detector detecting the entity, whereas in other embodiments the activation may be triggered manually.

Figure 1:
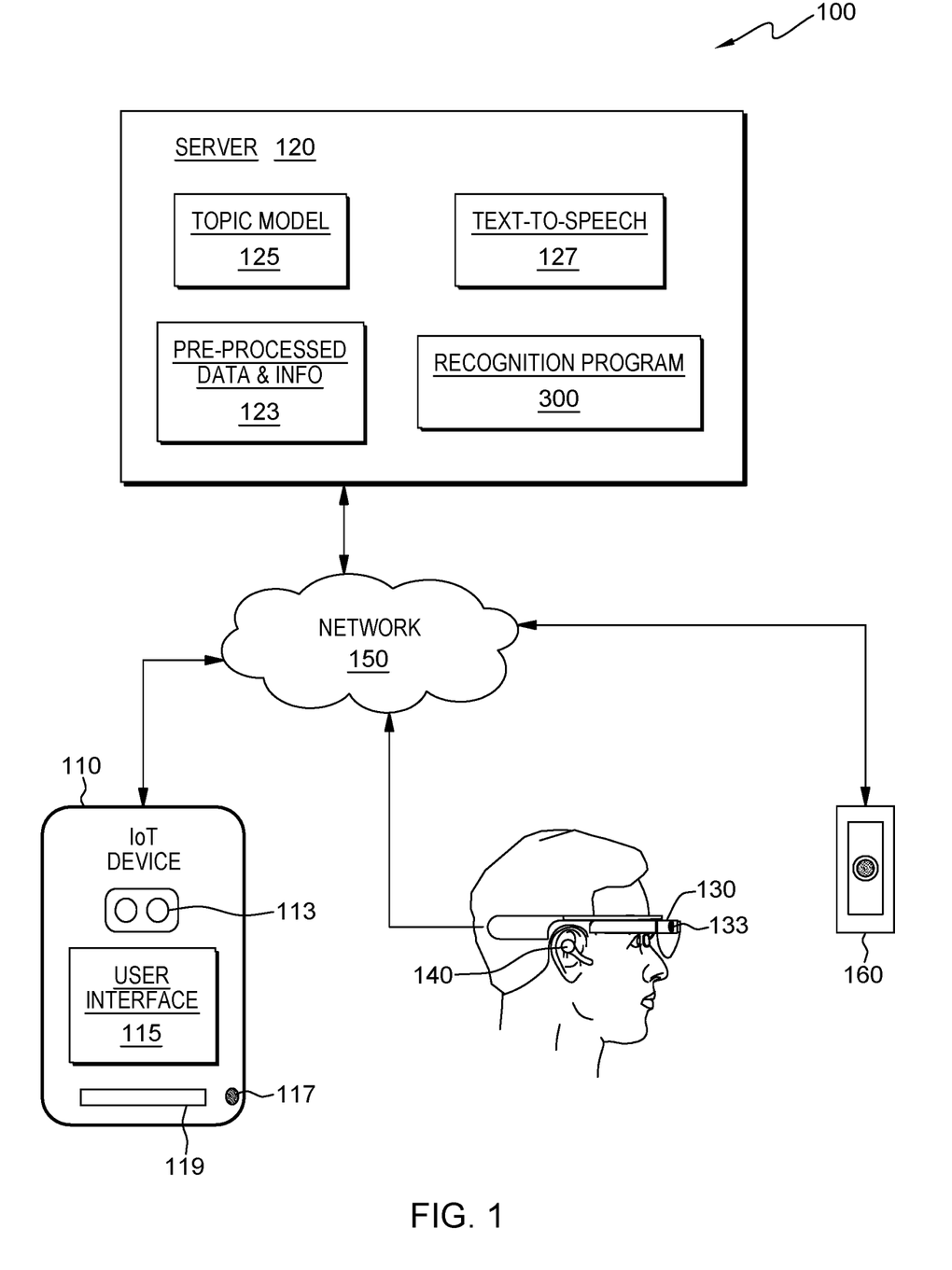
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes IoT device 110, server 120, augmented reality (AR) glasses 130, wireless ear pod 140, and IoT doorbell camera 160, all interconnected via network 150. IoT device 110 is depicted as including camera 113 and user interface 115. Server 120 is depicted as including topic model 125, text-to-speech 127, pre-processed data and info 123, and recognition program 200.

Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between IoT device 110, server 120, topic model 125, recognition program 200, AR glasses 130, wireless ear pod 140, and IoT doorbell camera 160, in accordance with embodiments of the present invention.

IoT device 110 includes camera 113, user interface 115, microphone 117, and speaker 119. IoT device 110 depicts a generic "Internet of things" device that includes camera functionality to capture video images (video frames or photograph frames) of entities in an immediate surrounding of a user. In some embodiments, IoT device 110 includes microphone 117 and speaker 119 to monitor audio data and deliver audio responses, respectively, to the assisted user regarding recognition (or non-recognition) of an encountered entity.

In some embodiments, IoT device 110 is a standalone mobile computing device, a smartphone, a tablet computer, a smartwatch, a body-cam, a programable action camera, a laptop computer, a netbook computer, or other electronic device or computing system capable of capturing image and audio data, and receiving, sending, and processing of data. In other embodiments, IoT device 110 may be a computing device interacting with applications and services hosted and operating in a cloud computing environment. In another embodiment, IoT device 110 can be a desktop computer, a personal digital assistant (PDA), or another programmable electronic device capable of generating input to and receiving programming instructions from recognition program 200 hosted on server 120. Alternatively, in some embodiments IoT device 110 may be communicatively connected to recognition program 200 operating remotely on server 120. IoT device 110 may include internal and external hardware components, depicted in more detail in FIG. 3.

User interface 115 provides an interface to access features and functions of IoT device 110. In some embodiments of the present invention, user interface 115 provides access to recognition program 200, operating on server 120. User interface 115 may also support access to other applications, features, and functions of IoT device 110 (not shown), such as the assisted user or a trusted user manually adding annotations and reminders associated with real-time entities encountered. In some embodiments, user interface 115 displays text content of annotations associated with a known entity and, alternatively, actions to take associated with an unknown entity encountered.

User interface 115 supports access to alerts, notifications, and provides forms of communications. In one embodiment, user interface 115 may be a graphical user interfaces (GUIs) or web user interfaces (WUIs) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of IoT device 110. User interface 115 enables respective users of IoT device 110 to receive, view, hear, and respond to input, access applications, display content of online conversational exchanges, and perform available functions.

Camera 113 is an integrated feature of IoT device 110. In various embodiments, camera 113 includes image capturing capability of IoT device 110. In some embodiments, camera 113 includes both photo and video function and interacts with additional functions of IoT device 110 to capture images of entities encountered by the assisted user. In some embodiments, camera 113 captures image frames of an encountered entity by detecting the entity within a proximity of IoT device 110, whereas in other embodiments, camera 113 initiates capture of image frames based on motion detection of an entity. In still other embodiments, camera 113 captures image frames based on manual initiation by the assisted user.

Microphone 117 and speaker 119 are features of IoT device 110 that enable receipt of audio input and generation of audio output, respectively. In some embodiments, microphone 117 may be an integral feature of IoT device 110, whereas in other embodiments, microphone 117 may be remotely connected to IoT device 110 by wired or wireless technology (not shown). In some embodiments, microphone 117 receives audio input as an annotation associated with a known entity, which may include additional information, topic of discussion from a current or recent encounter, or reminder information associated with a known entity.

In some embodiments, speaker 119 may be an integral feature of IoT device 110 and provide audio output identifying a known entity based on image recognition of pre-processed data and information 123, which in some embodiments, includes text annotations associated with the known entity converted to speech via text-to-speech technology, such as text-to-speech 127 of server 120. In other embodiments, speaker 119 may provide audio output of recorded audio stored as a digitized audio file associated with a known entity, included as part of pre-processed data and information 123. In some embodiments, speaker 119 may be remotely connected to IoT device 110 by wire or wireless connection.

Server 120 is depicted as including pre-processed data and information 123, topic model 125, text-to-speech 127, and recognition program 200. Server 120 includes the collection and storage capability for the captured and annotated content of pre-processed data and information 123 associated with known entities of the assisted user. In some embodiments of the present invention, server 120 represents a virtual computing device operating based on multiple computers as a server system, such as in a cloud computing environment, and provides access and connectivity of IoT device 110, augmented reality (AR) glasses 130, wireless ear pod 140, and IoT doorbell camera 160, to recognition program 200 and other function and resources residing on server 120, via network 150.

In some embodiments, server 120 can be a web server, a blade server, a desktop computer, a laptop computer, a tablet computer, a netbook computer, or any other programmable electronic computing device capable of receiving, sending, and processing data, and communicating with features and functions of IoT device 110, augmented reality (AR) glasses 130, wireless ear pod 140, and IoT doorbell camera 160, and other computing devices (not shown) within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 3.

Pre-processed data and information 123 is a collection of digitized data and annotation information associated with a plurality of entities known to the assisted user. Pre-processed data and information 123 includes digitized image frames from photos and/or video captures of entities, and each set of images associated with a particular entity includes annotated information regarding the relationship and relevance of an entity to the assisted user. In some embodiments, the annotated information includes text identifying the entity and explaining the relationship and relevance of the entity and may further include some or all of information regarding reminders, subject matter and topics discussed, and recommended actions to take upon an encounter with the entity.

In some embodiments, the collection of images, audio inputs, and annotations comprising pre-processed data and information 123 is generated by input from a trusted source of the assisted user to whom the collection of entity images and/or audio inputs are known. The trusted user submits one or more images to pre-processed data and information 123 and includes annotations identifying the entity corresponding to the image, the relationship and/or relevance of the entity to the assisted user, and additional information appropriate for the relevance of the entity. In some embodiments, the assisted user adds annotations associated with a known entity, such as a reminder or comments from a most recent encounter with the entity. In other embodiments, an audio recording of an encounter with the entity is made and submitted to topic model 125, which produces a topic summary set of text associated with the entity encounter, and is played back in response to a subsequent recognition of the entity, to provide a reminder of the topics discussed previously. In some embodiments, an annotation may be provided to the assisted user in the event of encountering an unknown entity.

Embodiments of the present invention include receipt of consent for the use of any personal or private information associated with the collection of images, audio inputs, and annotations comprising pre-processed data and information 123. In embodiments, recognition program 200 enables entry of image frames, audio content, and additional information input as annotations performed by a trusted user and includes requests for consent from the respective users associated with the respective data to be entered into pre-processed data and information 123. Requests include notice of the potential collection of personal data and notice of audio conversation summarization allowing the user to opt-in or opt-out of consent to process collected data. Respective users may give consent for the collection and storage of image data, audio data, and associated additional information to be included in pre-processed data and information 123. In some embodiments, the confirmation of opt-in consent is communicated to back to the consenting user, for example, by email. Consent can take several forms. Opt-in consent can impose on the user to take an affirmative action. Alternatively, opt-out consent can impose on the user to take an affirmative action to prevent the processing of personal data before personal data is processed.

Topic model 125 is an algorithm based natural language processing (NLP) model that reduces large amounts of textual content to brief coherent summaries. In some embodiments, topic mode 125 may apply an existing algorithm to text content stored in pre-processed data and information 123, reducing a recorded dialog with a known entity of the assisted user, and the recorded dialog transformed from an audio recording to textual content using text-to-speech 127, which includes NLP technology to convert digitized text to digitized speech, and speech to text.

In an example embodiment, a dialog between a known entity and the assisted user is recorded and stored in pre-processed data and information 123. Server 120 can utilize text-to-speech 127 to transform the recorded content into text and summarize the text utilizing topic model 125. The summary is made available as an audio feed to the assisted user upon recognition of the entity at a subsequent encounter, by transforming the summarized text to an audio feed by text-to-speech 127. In some embodiments, topic model 127 summarizes text content received by the assisted user, based on properly configured text applications, such as email and short messaging service (SMS) accounts.

Text-to-speech 127 is an NLP assistive technology that receives and reads digitized textual content and converts the content to digitized speech that can be processed as audio output to speaker 119, for example. Alternatively, text-to-speech 127 includes techniques to receive natural language speech and convert the audio feed to digitized text. Text-to-speech 127 works in conjunction with topic model 125 and pre-processed data and information 123 in support of recognition program 200.

Recognition program 200 is depicted as hosted and operating on server 120, and communicatively connected to IoT device 110, AR glasses 130, wireless ear pod 140, and IoT doorbell 160. Recognition program 200 receives digitized data of an entity encounter from IoT devices, such as IoT device 110 and compares the received digitized data to the stored digitized data in pre-processed data and information 123. The content of pre-processed data and information 123 includes the identification data of known entities and information associated with the known entities of the assisted user. Recognition program 200 utilizes facial and object recognition technologies to determine whether the received digitized data from IoT device 110 matches data of a known entity found in pre-processed data and information 123. If recognition program 200 determines a match, then recognition program 200 delivers identification of the known entity and annotated information associated with relationship and relevance of the known entity to the assisted user. In some embodiments, the annotated information associated with the relationship and relevance of the known entity may include a reminder for the assisted user for a subsequent encounter with the entity, or may include an action to take at a subsequent encounter of the known entity, or may include a summary of topic and subject matter discussions from previous encounters with the known entity.

In some embodiments of the present invention, recognition program 200 receives image frames from camera 113 of IoT device 110. Recognition program 200 compares the image frames received to images included in pre-processed data and information 123, and in response to determining a match with a known entity, presents the assisted user with identification and relevance information associated with the known entity, matched from the received image frames. In some embodiments, the digitized data received includes audio input from microphone 117 of IoT device 110. Recognition program 200 compares the digitized audio input received to audio input stored in pre-processed data and information 123 using voice/sound recognition technology, and in response to determining a match, identifies the known entity associated with the audio input received.

In some embodiments, information regarding the relationship and/or relevance of the identified entity is converted from text to speech and transmitted to speaker 119 of IoT device 110. For example, a trusted user may have input text content identifying a relative of the assisted user and included annotations describing the relationship and favorite interests shared between the relative and the assisted user. In response to recognition program 200 receiving an image frame of the relative of the assisted user from camera 113 of IoT device 110, recognition program 200 identifies the relative from images found in pre-processed data and information 123, and generates a text-to-speech (TTS) feed to speaker 119 that indicates the relation of the relative to the assisted user and the favorite interests shared from the annotated information associated with the relative as a known entity. Alternatively, information associated with an identified known entity may be delivered as text to a display accessible to the assisted user, such as user interface 115 of IoT device 110.

Augmented reality (AR) glasses 130 depicts an alternate type of IoT device to provide input of digitized data to recognition program 200. In some embodiments, AR glasses 130 includes camera functionality to capture image frames of entities the assisted user encounters and microphone 133 to capture audio input. In some embodiments, AR glasses 130 includes a visual display (not shown) on an internal surface of AR glasses 130 for the assisted user to receive text-based information associated with a known entity. Wireless ear pod 140 is depicted as an alternative for receiving audio delivery of information associated with the recognition and identification of a known entity. In some embodiments AR glasses 130 with camera functionality and microphone 133 and wireless ear pod 140 act as an alternative to IoT device 110.

IoT doorbell camera 160 depicts an alternative IoT device that may work in conjunction with IoT device 110 or AR glasses 130 as a camera source of image frames received by recognition program 200. In some embodiments, IoT doorbell camera 160 is communicatively connected to recognition program 200, providing image frame input for comparison to image frames stored in pre-processed data and information 123. In some embodiments, recognition program 200 determining a match of an image of pre-processed data and information 123 with an image from IoT doorbell camera 160 results in the delivery of information associated with the matched known entity to speaker 119 of IoT device 110. In an alternative embodiment, a determination of a match with an image from IoT doorbell camera 160 results in the delivery of information associated with the matched known entity to wireless ear pod 140, worn by the assisted user, or to speaker 119 of IoT device 110.

Figure 2:
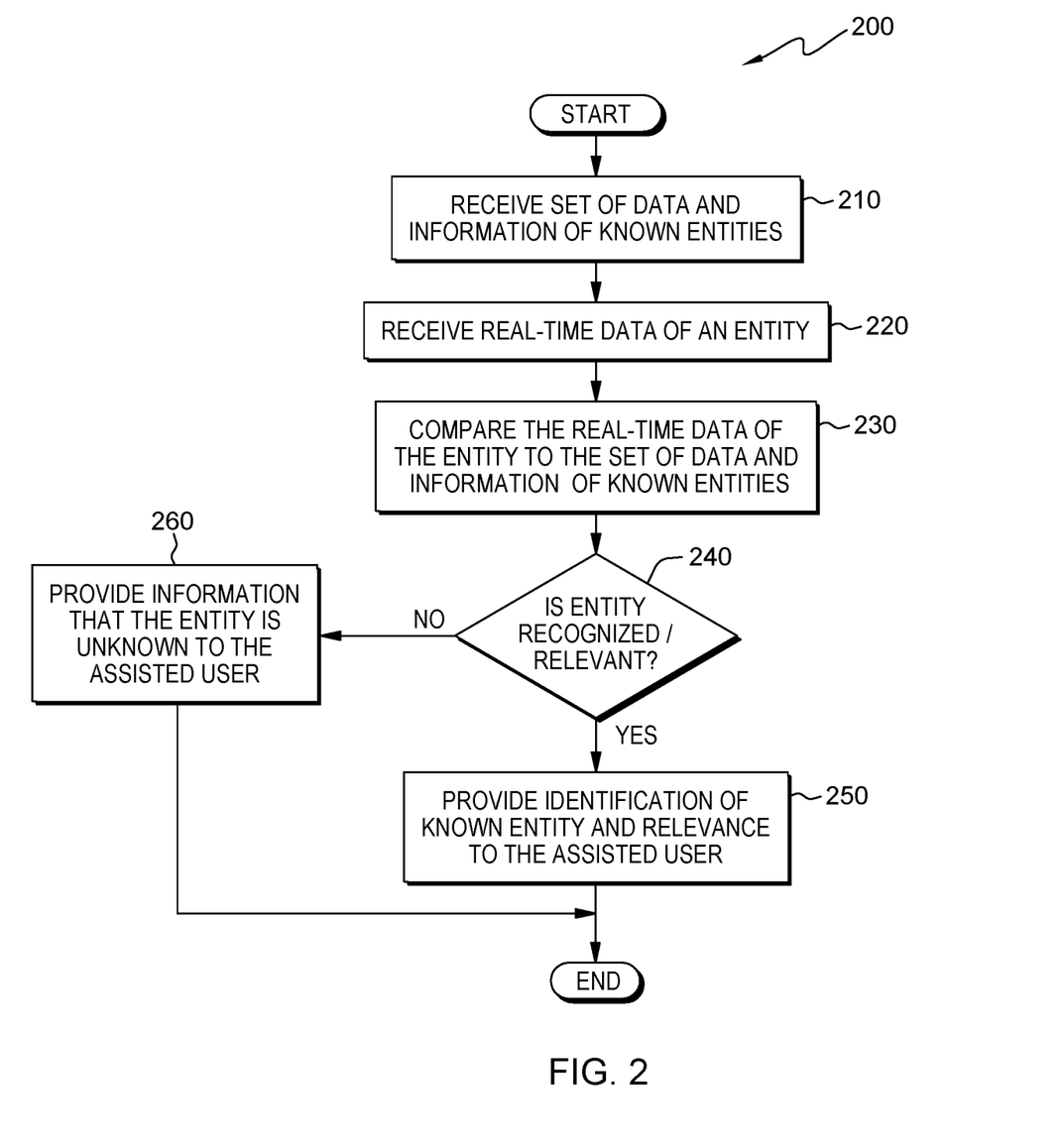
FIG. 2 is a flowchart depicting operational steps of a recognition program, operating in the distributed data processing environment of FIG. 1, in accordance with embodiments of the present invention.

FIG. 2 is a is a flowchart depicting operational steps of recognition program 200, operating in the distributed data processing environment of FIG. 1, in accordance with embodiments of the present invention. Recognition program 200 receives a set of data and information of known entities (step 210). Recognition program 200 receives data associated with the recognition of known entities of the assisted user and the received data are stored in memory accessible to recognition program 200. A user trusted by the assisted user may include additional information associated with respective data of a known entity, identifying the entity and including information regarding the relevance or relationship of the entity to the assisted user. In some embodiments, the received data is image data previously captured from digitized photograph frames or video frames. In other embodiments, the received data may be audio data from or about an entity known to the assisted user, such as a voice recording of a known person, or a soundtrack associated with a location or object known to the assisted user.

For example, a trusted user, such as a daughter of the assisted user, inputs image frames of persons known to the assisted user to be received by recognition program 200, including family members, neighbors, acquaintances, and close friends, into pre-processed data and information 123. The trusted user adds additional information with each image identifying the subject person of the image, and includes additional information indicating the relevance and relationship of the known person to the assisted user. In some embodiments, the trusted user may include information directing the assisted user to take a specific action in response to recognition of an entity as known or unknown during an encounter.

Recognition program 200 receives real-time data of an entity (step 220). Recognition program 200 receives data input from an IoT device of the assisted user. In some embodiments of the present invention, the IoT device of the assisted user includes augmented reality glasses, configured to capture images and audio encountered by the assisted user, and a wireless ear pod for receiving audio-based information from recognition program 200. In other embodiments, the IoT device may be a device worn on or over the clothing of the assisted user, such as a bodycam and microphone combination, which may further include a speaker or earphone to receive audio-based information. In some embodiments, recognition program 200 operates from a server in a cloud environment, accessible to the IoT devices via wireless network connections, such as network 150. Recognition program 200 receives image frames of an entity and audio input from the IoT device as the assisted user encounters the entity in real-time.

For example, an assisted user wearing AR glasses 130 configured with camera functionality to capture image frames and microphone 133 to receive audio input. The assisted user views an approaching person, and recognition program 200 initiates capture of image frames by AR glasses 130. Recognition program 200, operating on server 120, receives real-time image frames of the approaching person from AR glasses 130 and audio input detected during the encounter with the approaching person via network connection 150.

Recognition program 200 compares the real-time data of the entity to the set of data and information of known entities (step 230). Recognition program 200 accesses the set of data and information of known entities and compares the data of the entity received in real-time to determine whether the entity is known to the assisted user. In some embodiments of the present invention, recognition program 200 utilizes facial recognition, object recognition, and character recognition technologies in comparison of the real-time data of an entity received to the set of data and information of known entities, pre-processed by the trusted user. In some embodiments, the real-time data is one or more image frames of the entity. In other embodiments, the received data includes audio input associated with the encounter of the entity.

For example, a person (i.e., entity) approaches the front door of the residence of the assisted user, and the motion activates IoT doorbell 160, and recognition program 200 initiates the camera function to capture real-time data of the person at the front door of the assisted user. The real-time data includes multiple image frames of the person at the door which are received by recognition program 200 and the image frames are compared to images included in pre-processed data and information 123, stored on server 120. Recognition program 200 applies facial recognition and object recognition to determine whether a match exists between the real-time data of the person and data and information associated with entities known to the assisted user.

Recognition program 200 determines whether the entity is recognized as known to the assisted user (decision step 240). Having compared the real-time data received to existing data of entities known to the assisted user, recognition program 200 determines whether the real-time data matches an entity known to the assisted user. For the case in which recognition program 200 determines that the entity encountered is not recognized as known to the assisted user (step 240, "NO" branch), recognition program 200 provides information to the assisted user that the entity observed or encountered is unknown (step 260). In some embodiments, recognition program 200 provides an audible response alerting the assisted user that the entity is unknown and recognition program 200 may also include instructions for a response or action the assisted user should take. In other embodiments, recognition program 200 generates a text response on a display accessible to the assisted user, alerting the assisted user that the entity is unknown.

For example, recognition program 200 determines that an entity (person) at the front door of the assisted user's residence is not known to the assisted user. Recognition program 200 generates an audio message sent to wireless ear pod 140 of the assisted user informing the assisted user that the person is unknown and includes instruction for the assisted user to contact a family member before opening the door. In some embodiments, recognition program 200 may automatically generate a contact message to a designated person (e.g., other family member) and may include an image of the unknown entity. Subsequent to recognition program 200 providing information that the entity is unknown to the assisted user and additional information of instruction or action to take, recognition program 200 ends.

For the case in which recognition program 200 determines that the entity encountered is recognized as known to the assisted user (step 240, "YES" branch), recognition program 200 provides identification of the known entity to the assisted user (step 260). In some embodiments of the present invention, the identification information is provided by an audio message as part of the pre-processed set of data and information (i.e., pre-processed data and information 123) of known entities provided by a trusted user and sent to a speaker accessible to the assisted user.

In some embodiments, recognition program 200 includes additional information associated with the known entity, such as the relevance of the entity to the assisted user, as well as a relationship of the entity to the assisted user. In some embodiments, the additional information may include a summary of conversation topics from the most recent encounter with the entity, providing a recall feature for the assisted user. In yet other embodiments, the additional information may include a reminder entered by the assisted user during or subsequent to the previous encounter with the entity, which may be in the form of an audio input, converted and saved as text by recognition program 200 applying speech to text techniques. Alternatively, the reminder input may be a textual input saved as associated with the known entity in pre-processed data and information 123. In still other embodiments, the identification information may be a text-based message delivered to a display accessible to the assisted user.

For example, subsequent to comparing the real-time image frames of an entity captured by camera 113 of IoT device 110 and received by recognition program 200 via network 150, recognition program 200 determines that the real-time image frames match image data of pre-processed data and information 123, identifying an entity as known to the assisted user. The entity is a favorite restaurant of the assisted user and recognition program 200 identifies the restaurant entity by character recognition of the restaurant sign and object recognition of the exterior structure of the restaurant and adjacent buildings. Recognition program 200 provides an audio message to ear pod 140 worn by the assisted user, informing the assisted user of the identification of the entity and including information that this is the assisted user's favorite restaurant at which lasagna is usually ordered as a favorite meal. Recognition program 200 also includes a message that the assisted user's daughter paid for their last meal at the restaurant and includes a reminder that it is the assisted user's turn to pay for the meals. Subsequent to recognition program 200 providing identification, relevance, and additional information associated with the known entity to the assisted user, recognition program 200 ends.

Figure 3:
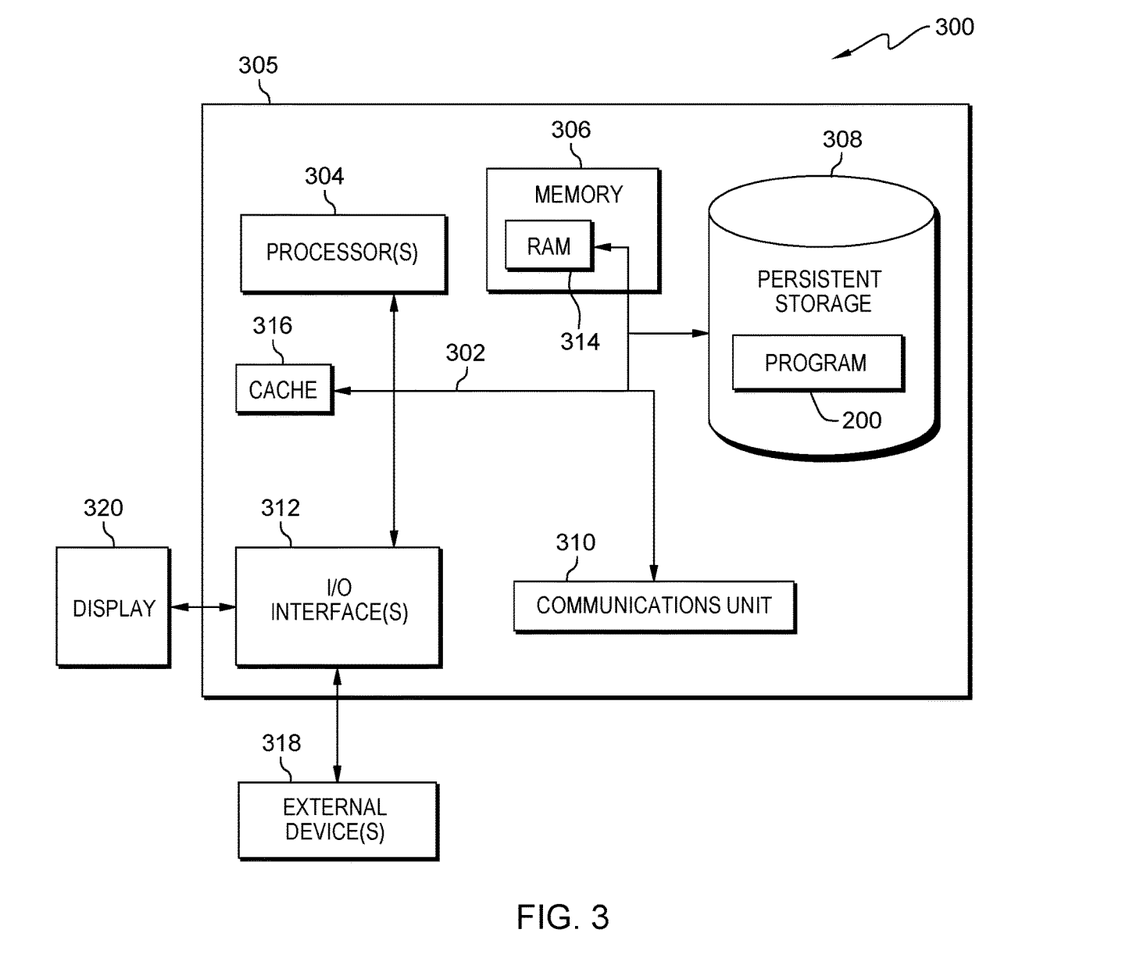
FIG. 3 depicts a block diagram of components of a computing system, including a computing device configured with the capability to operationally perform the recognition program of FIG. 2, in accordance with an embodiment of the present invention.

FIG. 3 depicts a block diagram of components of computing system 300, including computing device 305, configured to include or operationally connect to components depicted in FIG. 1, and capable of performing operational steps of recognition program 200 of FIG. 3, in accordance with an embodiment of the present invention, in accordance with an embodiment of the present invention.

Computing device 305 includes components and functional capability similar to components of IoT device 110 (FIG. 1), AR glasses 130, and portions of IoT doorbell 160, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, recognition program 200, are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Recognition program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., recognition program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for assisting recognition of an entity, the method comprising:
receiving, by one or more processors, associated information corresponding to a plurality of entities known to an assisted user, wherein an instance of associated information includes a set of data and identification and relevance of a respective entity of the plurality of entities known to the assisted user, and wherein the associated information includes annotations of the plurality of entities, respectively, that is provided, at least in part, by a trusted user of the assisted user to whom the plurality of entities are known;

receiving, by the one or more processors, real-time data corresponding to an encounter with a first entity from one or more devices capturing the real-time data;

determining, by the one or more processors, whether the first entity is known to the assisted user, by comparing the real-time data to the associated information corresponding to the plurality of entities known to the assisted user;

in response to determining the first entity is known by the assisted user, providing, by the one or more processors, an identification and relevance of the first entity to the assisted user;

in response to determining the first entity does have the known relevance to the assisted user, adding, by the one or more processors, annotations made by the assisted user regarding the encounter with the first entity to the associated information corresponding to the first entity; and in response to a subsequent encounter of the assisted user with the first entity, presenting, by the one or more processors, to the assisted user the annotations added to the associated information corresponding to the first entity.

2. The method of claim 1, further comprising:

receiving from a trusted user, by one or more processors, pre-processing data and information corresponding respectively to the plurality of entities known to the assisted user, wherein the pre-processing data and information of a respective entity known to the assisted user includes data identifying the respective entity known to the assisted user and information indicating the relevance of the respective entity known to the assisted user;

generating, by the one or more processors, the set of pre-processing data and information corresponding respectively to the plurality of entities known to the assisted user; and storing, by the one or more processors, the set of pre-processing data and information corresponding to the plurality of entities known to the assisted user in a repository.

3. The method of claim 1, wherein an entity known to the assisted user includes an entity selected from a group consisting of: a non-human living entity, a location, a structure, an object, and an event.

4. The method of claim 1, wherein the pre-processing data and information, and the real-time data includes audio data.

5. The method of claim 1, wherein the pre-processing data and information, and the real-time data includes frame images received from a camera.

6. The method of claim 1, wherein the pre-processing data and information associated with the first entity includes a reminder for the assisted user regarding the first entity.

7. The method of claim 1, wherein a phrase of one or more terms is used as a wake-up action for initiating recognition assistance of an entity encountered by the assisted user.

8. The method of claim 1, further comprising:

in response to determining the first entity is unknown to the assisted user, providing, by the one or more processors, instructions of actions to take to an Internet-of-things (IoT) device accessible to the assisted user.

9. The method of claim 1, wherein the pre-processed data and information associated with the first entity includes contact information of a third party and action to be taken by the assisted user.

10. The method of claim 1, wherein the pre-processed data and information associated with the first entity includes a topic summary of a recorded previous conversation with the first entity.

11. A computer program product for assisting recognition of an entity, the computer program product comprising:

one or more computer-readable storage media; and program instructions stored on the one or more computer-readable storage media, the program instructions comprising:

program instructions to receive associated information corresponding to a plurality of entities known to an assisted user, wherein an instance of associated information includes a set of data and associated information includes identification and relevance of a respective entity of the plurality of entities known to the assisted user, and wherein the associated information includes annotations of the plurality of entities, respectively, that is provided, at least in part, by a trusted user of the assisted user to whom the plurality of entities are known;

program instructions to receive real-time data corresponding to an encounter with a first entity from one or more devices capturing the real-time data;

program instructions to determine whether the first entity is known to the assisted user by comparison of the real-time data to the associated information corresponding to the plurality of entities known to the assisted user; and in response to determining the first entity is known by the assisted user, program instructions to provide an identification and relevance of the first entity to the assisted user;

in response to determining the first entity does have the known relevance to the assisted user, adding, by the one or more processors, annotations made by the assisted user regarding the encounter with the first entity to the associated information corresponding to the first entity; and in response to a subsequent encounter of the assisted user with the first entity, presenting to the assisted user the annotations added to the associated information corresponding to the first entity.

12. The computer program product of claim 11, further comprising:

program instructions to receive from a trusted user, pre-processing data and information corresponding respectively to the plurality of entities known to the assisted user, wherein the pre-processing data and information of a respective entity known to the assisted user includes data identifying the respective entity known to the assisted user and information indicating the relevance of the respective entity known to the assisted user;

program instructions to generate the set of pre-processing data and information corresponding respectively to the plurality of entities known to the assisted user; and program instructions to store the set of pre-processing data and information corresponding to the plurality of entities known to the assisted user in a repository.

13. The computer program product of claim 11, wherein an entity known to the assisted user includes an entity selected from a group consisting of: a non-human living entity, a location, a structure, an object, and an event.

14. The computer program product of claim 11, wherein the pre-processing data and information, and the real-time data includes one or a combination selected from a group consisting of: audio data, frame images, a phrase of terms used to input an entity as known to the assisted user, and a reminder content for the assisted user regarding the first entity.

15. A computer system for assisting recognition of an entity, the computer system comprising:
one or more computer processors;
one or more computer-readable storage media; and
program instructions stored on the one or more computer-readable storage media, the program instructions comprising:
program instructions to receive associated information corresponding to a plurality of entities known to an assisted user, wherein an instance of associated information includes a set of data and identification and relevance of a respective entity of the plurality of entities known to the assisted user, and wherein the associated information includes annotations of the plurality of entities, respectively, that is provided, at least in part, by a trusted user of the assisted user to whom the plurality of entities are known;
program instructions to receive real-time data corresponding to an encounter with a first entity from one or more devices capturing the real-time data;
program instructions to determine whether the first entity is known to the assisted user by comparison of the real-time data to the associated information corresponding to the plurality of entities known to the assisted user; and
in response to determining the first entity is known by the assisted user, program instructions to provide an identification and relevance of the first entity to the assisted user;
in response to determining the first entity does have the known relevance to the assisted user, adding, by the one or more processors, annotations made by the assisted user regarding the encounter with the first entity to the associated information corresponding to the first entity; and
in response to a subsequent encounter of the assisted user with the first entity, presenting to the assisted user the annotations added to the associated information corresponding to the first entity.

16. The computer system of claim 15, wherein in response to determining the first entity is unknown to the assisted user, the one or more processors providing information to an IoT device accessible to the assisted user.

17. The computer system of claim 15, wherein the pre-processed data and information associated with the first entity includes contact information of a third party and action to be taken by the assisted user.

18. The computer system of claim 15, wherein the pre-processed data and information associated with the first entity includes a topic summary of a recorded previous conversation with the first entity.

* * * * *